Sept. 20, 1938.  E. H. WIRTH  2,130,979
PATTERN WHEEL DRIVE FOR WARP KNITTING MACHINES
Filed April 5, 1938  3 Sheets-Sheet 1

Inventor:
Emil H. Wirth.
By William C. Linton
Atty.

Sept. 20, 1938.  E. H. WIRTH  2,130,979
PATTERN WHEEL DRIVE FOR WARP KNITTING MACHINES
Filed April 5, 1938  3 Sheets-Sheet 2
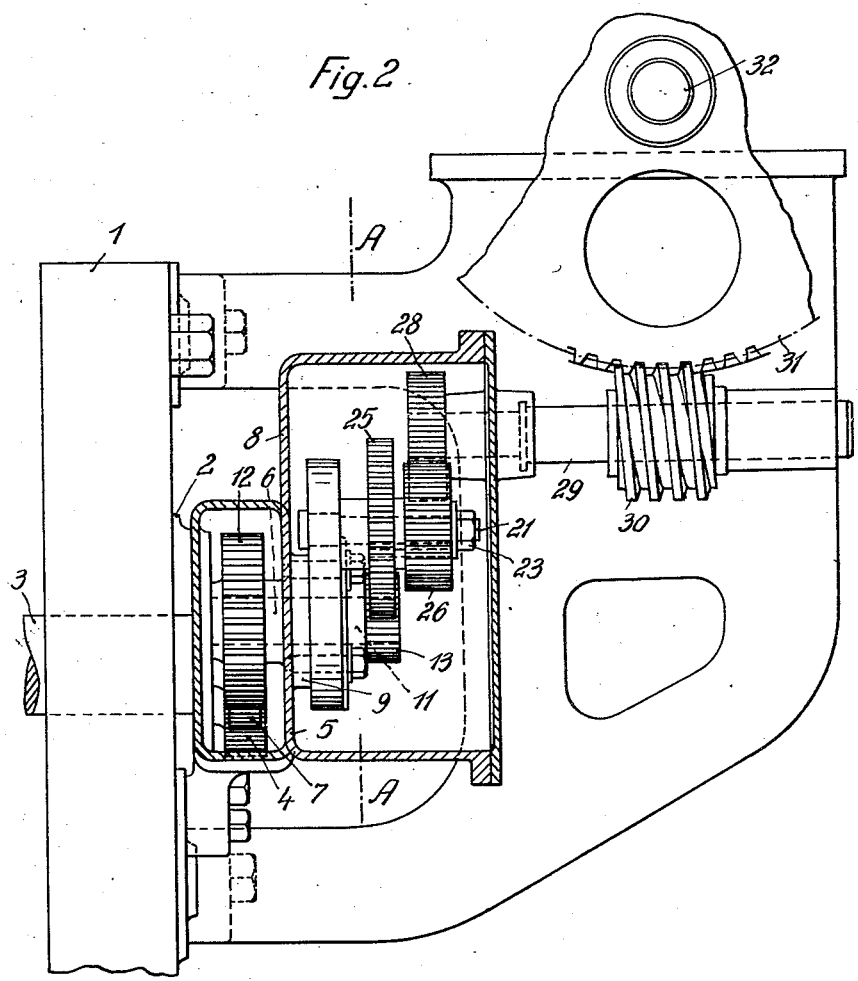
Inventor:
Emil H. Wirth
By William C. Linton
Atty.

Sept. 20, 1938.    E. H. WIRTH    2,130,979
PATTERN WHEEL DRIVE FOR WARP KNITTING MACHINES
Filed April 5, 1938    3 Sheets-Sheet 3
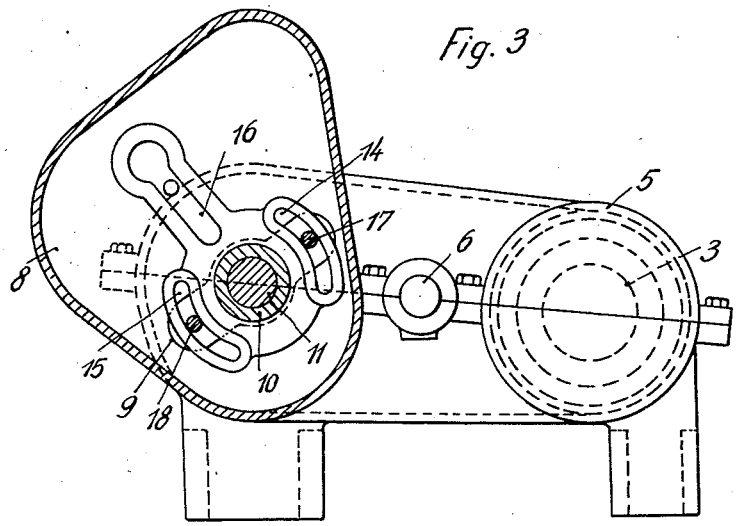
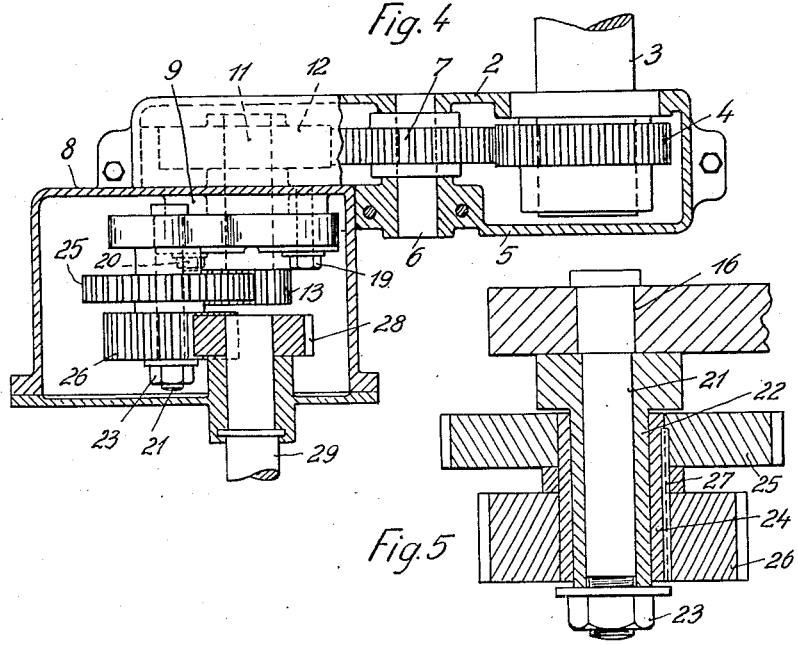
Inventor:
Emil H. Wirth.
By William C. Linton
Atty.

Patented Sept. 20, 1938

2,130,979

UNITED STATES PATENT OFFICE 2,130,979

PATTERN WHEEL DRIVE FOR WARP KNITTING MACHINES

Emil Herbert Wirth, Hartmannsdorf, near Chemnitz, Germany

Application April 5, 1938, Serial No. 200,234
In Germany June 19, 1937

2 Claims. (Cl. 66—86)

The present invention relates to a pattern wheel drive for warp knitting machines.

The known drives of pattern wheels or the like by a worm and a worm wheel hitherto required an exchange of the worm and the cooperating worm wheel against other corresponding elements.

If a certain pattern was to be worked, a worm wheel having a definite number of teeth, determined always by the pattern wheel, had to be produced for this purpose.

If for instance 82 courses are to be worked in two tempi a worm wheel having 82 teeth and a double threaded worm are to be provided. To work this lap in three tempi, the worm and worm wheel must be exchanged against a three threaded gear. Any further division of the notched disc then requires the use of the corresponding worm wheel and worm.

The above disadvantages are removed by the pattern wheel drive forming the subject matter of the invention. The object aimed at is obtained by the fact that the transmission from the cam shaft to the worm is effected by intermediate gear wheels adjustably arranged upon a regulating device. The bolt carrying the intermediate wheels may be adjusted in a radial slot of the regulating device. The latter may be oscillated on its pivot. Mounted on this pivot is a toothed wheel kinematically connected to the wheel of the cam shaft. By swinging or oscillating the regulating device and by shifting the bolt carrying the intermediate gear wheels, the adjustment of each pair of intermediate wheels can be effected in such a manner, that the one toothed wheel engages the toothed wheel driven by the cam shaft, whereas the other toothed wheel is in engagement with a toothed wheel mounted upon the shaft of the worm.

In the accompanying drawings the invention is shown by way of example.

In these drawings:

Fig. 2 is a side elevation of this drive,

Fig. 3 is a side elevation in section according to the line A—A of Fig. 2,

Fig. 4 shows a plan view partly in section, and

Fig. 5 shows a detail in sectional view.

Figure 1:
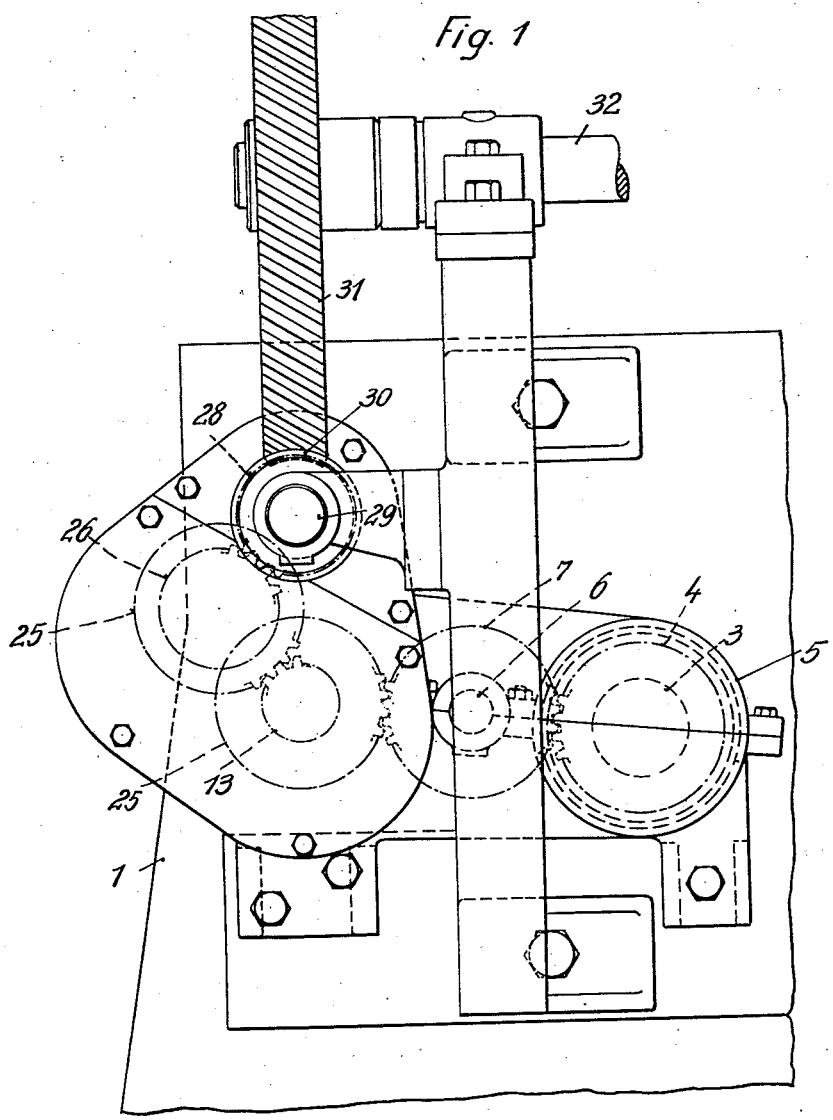
Fig. 1 is a front elevation of a pattern drive having a worm and a worm wheel.

Fixed to the frame 1 of the machine is a box the wall 2 of which has an opening through which extends the cam shaft 3 into the box. In the interior of the box a toothed wheel 4 is mounted upon the cam shaft. A shaft 6 is journalled in the wall 2 and in the opposite wall 5 and mounted on this shaft is an intermediate driving gear 7 engaging the toothed wheel 4. Mounted at the wall 5 is a further casing portion the wall 8 of which carries a reinforcing member 9 connected to a bearing sleeve 10. Journalled in the reinforcing member and the bearing sleeve 10 is a shaft 11 the end of which extending into the box carries a toothed wheel 12 engaging the intermediate gear wheel 7. The end of the shaft 11 protruding from the bearing sleeve 10 and extending into the above mentioned casing carries a small gear wheel 13.

Shifted upon the bearing sleeve 10 is a regulating device provided with two guide slots 14, 15 arranged concentrically to the bearing sleeve 10 and a radially extending slot 16. By means of two screws 17, 18 mounted in the reinforcing member 9 and extending through the guide slots 14, 15 the regulating device may be fixed in any desired position by means of nuts 19, 20.

Adjustably mounted in the radially extending slot 16 of the regulating device is a head bolt 21. Shifted upon the latter is a sleeve 22 which by means of a nut 23 may be pressed against the regulating device, thereby fixing the latter in an adjusted position. Loosely and rotatably mounted upon the sleeve 22 is another sleeve 24 carrying the intermediate wheels 25, 26 connected together and to the sleeve 24 by a wedge 27.

The wheel 25 engages the small toothed wheel 13 while the other gear wheel 26 engages a toothed wheel 28 mounted upon the end of the shaft 29 extending into the casing and carrying the worm 30 which drives the worm wheel 31 fixed upon the shaft 32 carrying the notched disc or the like.

By means of the gear wheel 4 mounted upon the cam shaft 3, the toothed wheel 28 mounted upon the worm shaft and thereby the worm 30 and the worm wheel 31 are driven by way of the intermediate driving gear 7, the gear wheel 12, the small gear wheel 13, and the intermediate gear wheels 25 and 26.

To obtain the drive for another division of the notched wheels or the like it is only necessary to exchange the intermediate wheels 25, 26 mounted upon the sleeve 24. By shifting the head bolt 21 in the radial slot of the regulating device at the one hand and by turning the regulating device around its bearing sleeve after loosening the nuts 19, 20, the newly mounted intermediate wheels 25, 26 may be adjusted in such a manner, that one of them again engages the small gear wheel 13, whereas the other engages the gear wheel 28. Depending upon the proportion or the size of the two intermediate toothed wheels 25, 26, the drive of the worm wheel may be changed to move the notched disc in accordance with the desired division. The same worm and the same worm wheel always are used and an exchange of them is no longer required.

What I claim is:

1. In a pattern wheel drive for warp knitting machines having exchangeable intermediate toothed wheels, a casing, a bearing sleeve arranged in said casing, a shaft journalled in said bearing sleeve, a toothed wheel carried by said shaft, an intermediate driving gear wheel kinematically connected to a toothed wheel mounted upon a cam shaft, a regulating device having two concentric guide slots and a radial slot shifted upon said bearing sleeve, a head bolt adjustably arranged in said radial slot, a sleeve fixed to said head bolt, two toothed wheels carried by said sleeve and engaging a small toothed gear mounted on said bearing sleeve and a toothed wheel fixed upon a worm shaft respectively.

2. In a pattern wheel drive for warp knitting machines having exchangeable intermediate toothed wheels, a casing, a bearing sleeve arranged in said casing, a reinforcing member carrying said bearing sleeve, a shaft journalled in said bearing sleeve, a toothed wheel carried by said shaft, an intermediate driving gear wheel kinematically connected to a toothed wheel mounted upon a cam shaft, a regulating drive having two concentric guide slots and a radial slot shifted upon said bearing sleeve, a head bolt adjustably arranged in said radial slot, screw bolts fixed in said reinforcing member and extending through said concentric guide slots of said regulating device, nuts engaging said screw bolts to fix said regulating device in any desired position, a sleeve fixed to said head bolt, two toothed wheels carried by said sleeve and engaging a small toothed gear mounted on said bearing sleeve and a toothed wheel fixed upon a worm shaft respectively.

EMIL HERBERT WIRTH.